3,453,974
STRONG WALL STRUCTURES
Jean Gerard, Neuilly-sur-Seine, France, assignor to Fichet Bauche, Suresnes, France
Continuation-in-part of application Ser. No. 462,958, June 10, 1965. This application Feb. 21, 1968, Ser. No. 707,150
Claims priority, application France, June 17, 1964, 978,622
Int. Cl. E04b 2/76
U.S. Cl. 109—83        9 Claims

ABSTRACT OF THE DISCLOSURE

A strong wall structure which is resistant to thermal and mechanical attack by the provision of a rubber layer between two concrete layers, the rubber layer containing adjoining steel cables which reinforce the rubber layer and form a barrier to mechanical penetration.

Cross related application

This application is a continuation-in-part of my earlier application Ser. No. 462,958, filed June 10, 1965 which in turn has a priority date of June 17, 1964 by virtue of my corresponding application filed in France on that date.

Brief summary of the invention

The present invention relates to strong wall structures, such as used in safes, or other similar assemblies.

A strong wall structure has been proposed comprising, inside thereof, a layer including a compound adapted to give off toxic fumes when heated to a high temperature, such as, for instance, resulting from the attack thereof by means of a blowtorch. Such a layer, formed of various constituents presents, in itself, offers no resistance and does not therefore contribute to the resistance of the wall against a mechanical action.

It has also been proposed, on the other hand, to make use, inside a strong wall structure, of a rubber layer in order to reduce the drilling properties of a drilling tool, on account of the sticky deposit which is formed on the latter when attacking the layer. Such a layer, by its very nature, does not, in itself present any mechanical strength. In fact, it does not show any real effectiveness against modern drilling tools.

It is an object of the present invention to provide a strong wall structure, comprising a plate member or the like of natural or synthetic rubber, the hardness of which imparts thereto resistant qualities against the action of mechanical tools and/or against thermal attack.

Besides the resistance, presented by the rubber plate of a wall structure according to the invention to the action of mechanical tools, both of drilling and percussion tools, it resists the attack of blowtorches mainly and above all by the slowness of its combustion and, in addition, by the noxiousness produced by the choking fumes given off, which, moreover, may constitute an alarm.

Under certain conditions of torch attack, the combustion of the rubber takes place with liquefaction of the rubber and splattering thereof tends to clog the blowtorch.

Additionally, a strong wall structure according to the invention can not be effectively attacked by an oxy-cutter arc, since the rubber, which is electrically non-conductive, does not enable the initiation of an electric arc.

It is a further object of the invention to provide a preferably sheathed rubber plate which is interconnected with an element adjacent said wall structure, specifically an inner element, by mechanical attachment, by glueing or by vulcanization, which results in rendering highly difficult, if not utterly impossible, the tearing away or cut off portions of the plate.

The invention also provides that the inner element to which said rubber plate is coupled may be a metal plate, for instance of very hard steel which is highly resistant to penetration by drilling.

The invention will be best understood from the following description and appended drawings.

Detailed description

Figure 1:
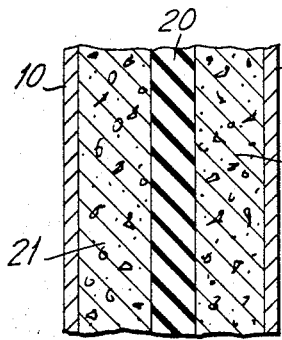
FIGURE 1 is a diagrammatic cross-sectional view of a wall structure according to the invention.

Referring first to FIG. 1, the wall structure of the invention comprises a plate 20 composed of rubber which is very rigid and has a Shore hardness of between 60 and 65 to provide a substantial resistance against the action of mechanical tools (both drilling and percussion tools) and of a blowtorch. The strong wall structure comprises a layer of concrete 21 located on the external side of plate member 20, and a layer of concrete 22, located on the internal side thereof. The concrete is refractory and endothermic and serves as a fire protector for the rubber and the contents of the enclosure, while it also offers substantial mechanical resistance to penetration of a character dissimilar from that of the rubber plate 20. It is this variation in the character of the various layers which serves to provide a psychological obstacle to penetration of the strong wall. This effect will be discussed in greater detail hereafter, when reference is made to more elaborate constructions.

Each of the concrete layers 21 and 22 are covered on their outer faces by metal plates 10, 11.

Figure 2:
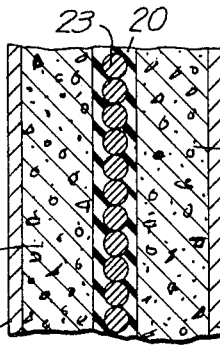
FIGURE 2 is a view similar to that of FIG. 1 of a modified version.

Reference is now made to FIG. 2, wherein a strong wall structure, similar to that illustrated in FIG. 1, is shown, but where the rubber plate has embodied therein an armored sheathing constituted by metal cables 23. These cables serve as a barrier to penetration by mechanical tools and are constituted of helically twisted steel wires. Thus, in seeking to penetrate the wall one is faced with the outer metal layer 10, concrete layer 21 and then the rubber layer reinforced with the cables 23. The aforesaid layers, and particularly the metal cables, which are highly resistant to mechanical penetration, are intended to induce the use of thermal attack for penetration, as the rubber will produce noxious fumes and tend to extinguish a blowtorch by splattering liquified rubber. This has a highly valuable psychological deterrant value against further penetration. The cables are of substantial diameter of the order of between 2.7 and 4.7 mm. The cables are immediately proximate one another and preferably in contact.

Figure 3:
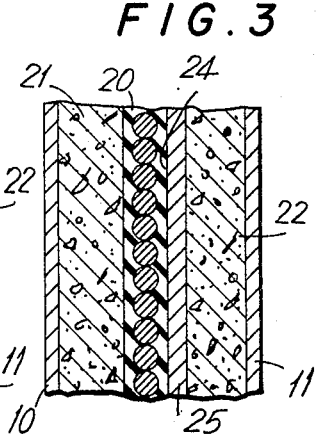
FIGURE 3 is a view to FIG. 1 of another version of the arrangement according to the invention.

In the embodiment shown in FIG. 3, the rubber plate 20 is interconnected at its inner face 24 with a metal sheet 25, thus rendering still more difficult the piercing of the wall structure, since it is necessary to tear the rubber off the sheet 25. The plate 25 is an armor plate of great hardness which is highly resistant to penetration by a drilling tool, thereby inducing the use of a cutting torch, which will have the effect of producing choking gases upon contact with the rubber and splattering of liquified rubber droplets.

Figure 4:
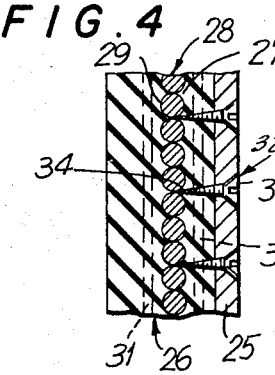
FIGURE 4 illustrates diagrammatically a portion of the wall structure according to one embodiment of the invention.

FIG. 4 illustrates diagrammatically a plate member 26 the use of which as a constituent part of the strong wall structure, in lieu of plate 20, is particularly advantageous. Plate member 26 comprises a body 27 of rubber (similar to that of plate 20) and an armored sheath 28 consisting of stranded steel wires 29, arranged in parallel relationship. Inner fabric cloth 30 and outer fabric covers 31 are provided in the plate member on opposite sides of sheath 28 to reinforce the rubber plate member 26 and render it more rigid and difficult to cut in sections and particularly from tearing away from the metal cables. The cloth 30 extends perpendicular to the cables of the sheath and is preferably constituted of a material such as nylon cord. For interconnecting plate member 26 with metal sheet element 25, use may be made of screws such as 32 the heads 33 of which are countersunk in sheet 25 and the tips 34 of which project between two successive steel wires 29.

Figure 5:
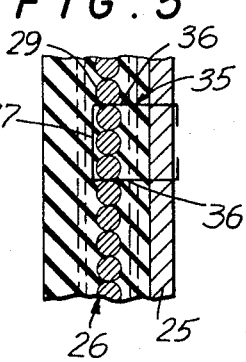
FIGURE 5 is a view similar to that shown in FIG. 4, for an alternative embodiment of the invention.

According to an alternative embodiment, the interconnection, as diagrammatically illustrated in FIG. 5, may use yoke-links such as 35 the parallel branches of which 36, 36' are inserted into slots preliminarily formed in plate 26, and of which a further branch element 37 encompasses a certain number of wires 29.

Figure 6:
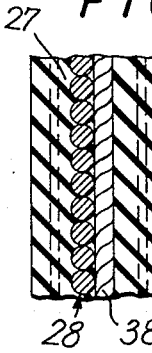
FIGURE 6 illustrates a portion of a strong wall structure according to another embodiment of the invention.

FIG. 6 illustrates a further embodiment of a plate member according to the invention, comprising, embedded in the rubber mass 277, a first layer 28 of parallel steel wires and a second layer 38 of steel wires arranged in parallel relationship to one another, but perpendicular to the wires of layer 28. The wires in each of the two layers 28, 38 are in respective contacting relation and the wires of the layer are in contact with the wires of the other layer to form a virtually impenetrable barrier to mechanical penetration. The piercing of the wall by mechanical tools is thus made increasingly difficult when working from the outer surface of the wall. The rubber plate member in FIG. 6 is adapted for being inserted in the same manner, as shown in FIGS. 2 and 3, between concrete layers 21 and 22. Preferably, the rubber plate member will be mounted on armor plate 25 before being sandwiched between the concrete layers 21 and 22, in the manner as shown in FIG. 3.

Figure 7:
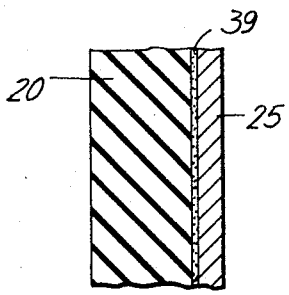
FIGURE 7 is an alternative embodiment, similar to those illustrated in FIGS. 4 and 5.

Referring now to FIG. 7, which illustrates a different alternate embodiment of the device, the armored or non-armored rubber plate 20 is interconnected with sheet 25 by bonding or glueing, the bonding joint being shown in 39.

A further advantageous embodiment is provided according to the invention, wherein the surface interconnection of the inner face of the rubber plate with sheet 25 is achieved by a thermal treatment, somewhat similar to curing or vulcanizing, which renders particularly difficult the tearing away of the plate relative to said sheet.

Figure 8:
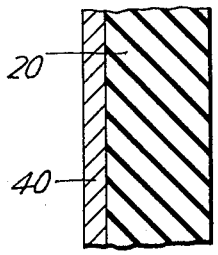
FIGURE 8 is a further embodiment of a strong wall structure according to the invention.

In FIG. 8 there is shown an embodiment according to which the armored or non-armored rubber plate 20 is brought into engagement with the internal face of a sheet 40 of a material of a high thermal conductivity, for instance of copper, or a copper alloy or the like; through this arrangement, the release of choking fumes is amplified in the case of a thermal attack of the metal or of the conductive alloy.

According to still a further alternative embodiment, the rubber plate, rather than being put in contact with the metal plate of high thermal conductivity, is placed sufficiently adjacent said plate for the latter to give off choking fumes when said metallic plate undergoes a thermal attack.

The invention also contemplates embodiments according to which a strong wall structure comprises a plurality of armored or non-armored rubber plates, or a plurality of assemblies of a rubber plate with a metal plate, or a rubber plate with an assembly of another rubber plate with a metallic plate.

What is claimed is:

1. A strong wall structure comprising a mass of rubber material in the form of a layer of substantial thickness, said rubber material having substantial hardness to resist mechanical penetration and thermal attack, reinforcing means embedded in said rubber layer, said reinforcing means comprising a plurality of metal wires of substantial diameter, said wires being arranged in close proximity to one another to form a layer of wires which is resistant to mechanical penetration, a layer of a setting material on said rubber layer on one surface thereof and a metal sheet member secured to said layer of rubber material on the opposite surface thereof.

2. A structure as claimed in claim 1, wherein said rubber has a Shore hardness of between 60 and 65.

3. A structure as claimed in claim 1, wherein said settable material is concrete.

4. A structure as claimed in claim 1 comprising a layer of cloth material embedded in said rubber material on opposite sides of the layer of wires.

5. A structure as claimed in claim 4, wherein said cloth material is constituted of nylon cords.

6. A structure as claimed in claim 1, wherein said reinforcing means comprises a second layer of metal wires adjacent the first layer and extending perpendicular thereto.

7. A structure as claimed in claim 6, wherein the wires in each of said layers are in contact with one another.

8. A structure as claimed in claim 6 comprising cords of cloth material embedded in said rubber layer to form spaced layers between which are disposed the layers of metal wires.

9. A structure as claimed in claim 1 comprising a second layer of settable material secured to the metal sheet member.

References Cited

UNITED STATES PATENTS 2,773,459   12/1956   Sechy _____ 109—82

FOREIGN PATENTS 577,785   5/1946   Great Britain.

REINALDO P. MACHADO, *Primary Examiner.*